United States Patent
Frederick et al.

(10) Patent No.: US 10,232,783 B2
(45) Date of Patent: Mar. 19, 2019

(54) ADAPTIVE TRUCK BED STORAGE

(71) Applicant: Toyota Motor Engineering & Manufacturing North America, Inc., Erlanger, KY (US)

(72) Inventors: Scott L. Frederick, Brighton, MI (US); Scott P. Robison, Dexter, MI (US); Adam D. Holmstrom, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 56 days.

(21) Appl. No.: 15/602,214

(22) Filed: May 23, 2017

(65) Prior Publication Data

US 2018/0339658 A1     Nov. 29, 2018

(51) Int. Cl.
    *B60R 9/00*          (2006.01)
    *B60R 5/04*          (2006.01)
    *B62D 33/02*        (2006.01)

(52) U.S. Cl.
    CPC .............. *B60R 5/044* (2013.01); *B62D 33/02* (2013.01)

(58) Field of Classification Search
    CPC ................................. B60R 5/044; B62D 33/02
    See application file for complete search history.

(56) References Cited

U.S. PATENT DOCUMENTS

| | | | | |
|---|---|---|---|---|
| 4,917,431 A | * | 4/1990 | McDonald | B60R 13/01 296/39.1 |
| 4,986,590 A | * | 1/1991 | Patti | B60R 13/01 105/423 |
| 5,988,722 A | * | 11/1999 | Parri | B60P 1/003 224/403 |
| 6,799,787 B2 | | 10/2004 | Angelos | |
| 7,111,887 B2 | | 9/2006 | Cooley | |
| 7,226,108 B2 | | 6/2007 | Altman | |
| 7,243,965 B2 | | 7/2007 | King et al. | |
| 9,540,050 B2 | | 1/2017 | Miller | |
| 2003/0085584 A1 | * | 5/2003 | Golden | B60R 13/01 296/39.2 |
| 2006/0082191 A1 | * | 4/2006 | McNulty | B62D 33/02 296/183.1 |
| 2007/0257507 A1 | * | 11/2007 | Hobrecht | B60J 7/1614 296/100.08 |
| 2008/0169674 A1 | * | 7/2008 | Giles | B60P 7/0892 296/183.1 |

(Continued)

*Primary Examiner* — Lori L Lyjak
(74) *Attorney, Agent, or Firm* — Christopher G. Darrow; Darrow Mustafa PC

(57) ABSTRACT

Arrangements described herein include adaptable storage systems for vehicle truck beds, and methods for controlling such systems. The system can include a panel having one or more wheel well cutouts. One or more wheel well covers can be operatively connected to the panel. A lift can be included that can selectively move the panel in an elevational direction between a top position and a bottom position. The wheel well cover(s) can be adaptive relative to the wheel wells to allow substantially unimpeded movement of the panel between the top position and the bottom position. Further, the wheel well cover(s) can substantially cover a wheel well cutout when the panel is in the top position.

18 Claims, 8 Drawing Sheets

(56) References Cited

U.S. PATENT DOCUMENTS

2008/0211251 A1* 9/2008 Diloreto .................. B60R 13/01
                                                    296/39.2
2008/0238133 A1* 10/2008 Hobrecht ................. B60J 7/141
                                                    296/136.03
2009/0146450 A1   6/2009 Flores

* cited by examiner

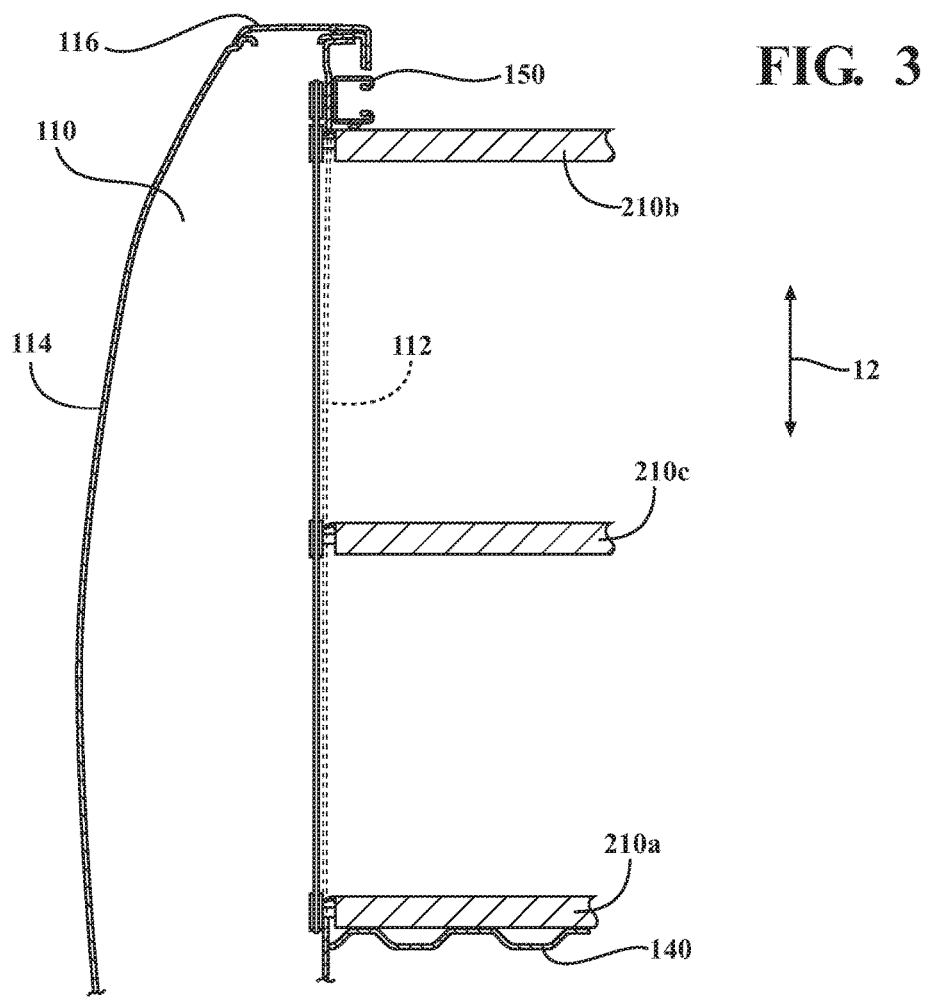
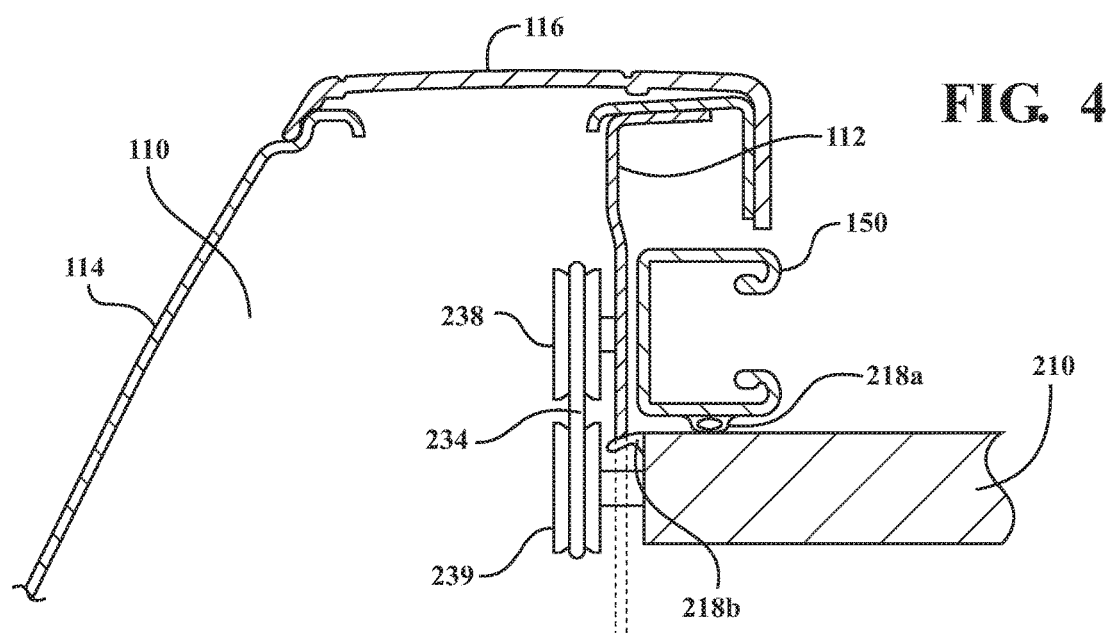

ADAPTIVE TRUCK BED STORAGE

FIELD

The subject matter described herein relates in general to vehicle cargo compartments and, more particularly, to adaptable truck bed storage components.

BACKGROUND

Modern vehicles can include compartments to transport cargo. Such compartments can include open cargo areas such as the bed of a pickup truck. The open bed of a pickup truck can allow users to transport large cargo items that extend above a top portion of the pickup bed. In these arrangements, the cargo can be visible and exposed to the elements. Tonneau covers can be used to shield cargo items within the pickup truck bed. Tonneau covers can, however, get in the way when loading or unloading large items in the pickup truck bed. For instance, a user may have to remove a tonneau cover in order to store large items. Further, it can be difficult for users to access items within the pickup truck bed.

SUMMARY

In one respect, the present disclosure is directed to an adaptable storage system for a vehicle truck bed. The vehicle truck bed includes wheel wells extending from inner side walls. The system includes a panel having a wheel well cutout and a wheel well cover operatively connected to the panel. The panel is configured for selective movement in an elevational direction between a top position and a bottom position. The wheel well cover is adaptive relative to the wheel wells to allow substantially unimpeded movement of the panel between the top position and the bottom position.

In another respect, the present disclosure is directed to a vehicle having an adaptable storage system. The vehicle includes a bed including a front panel, two sides, a tailgate, and a floor panel, the two sides each having an inner panel defining a wheel well. The vehicle further includes an adaptable storage system. The system includes a panel having two wheel well cutouts and two wheel well covers operatively connected to the panel. The system further includes a lift operatively connected to at least one of the two sides. The lift is configured to selectively move the panel in an elevational direction between a top position and a bottom position. The two wheel well covers are adaptive relative to the wheel wells to allow substantially unimpeded movement of the panel between the top position and the bottom position. The two wheel well covers are configured to substantially cover the two wheel well cutouts when the panel is in the top position.

In yet another respect, the present disclosure is directed to a method for controlling an adaptable storage system for a vehicle truck bed. The truck bed includes wheel well portions extending from inner side walls. The adaptable storage system includes a panel having two wheel well cutouts, two wheel well covers, and a lift system operable to raise and lower the panel and two wheel well covers. The method includes receiving an intended elevational position input for the panel. Responsive to receiving the input, the method includes causing the panel to move from a current position to the intended elevational position. The two wheel well covers are adaptive relative to the wheel wells to allow substantially unimpeded movement of the panel between the current position and the intended elevational position.

BRIEF DESCRIPTION OF THE DRAWINGS

FIG. 3 is a partial cross-sectional view showing different positions of a panel of the adaptable storage system of FIG. 1.

FIG. 4 is a partial cross-sectional view of the panel of the adaptable storage system of FIG. 1 showing seals used within the system.

DETAILED DESCRIPTION

Figure 1:
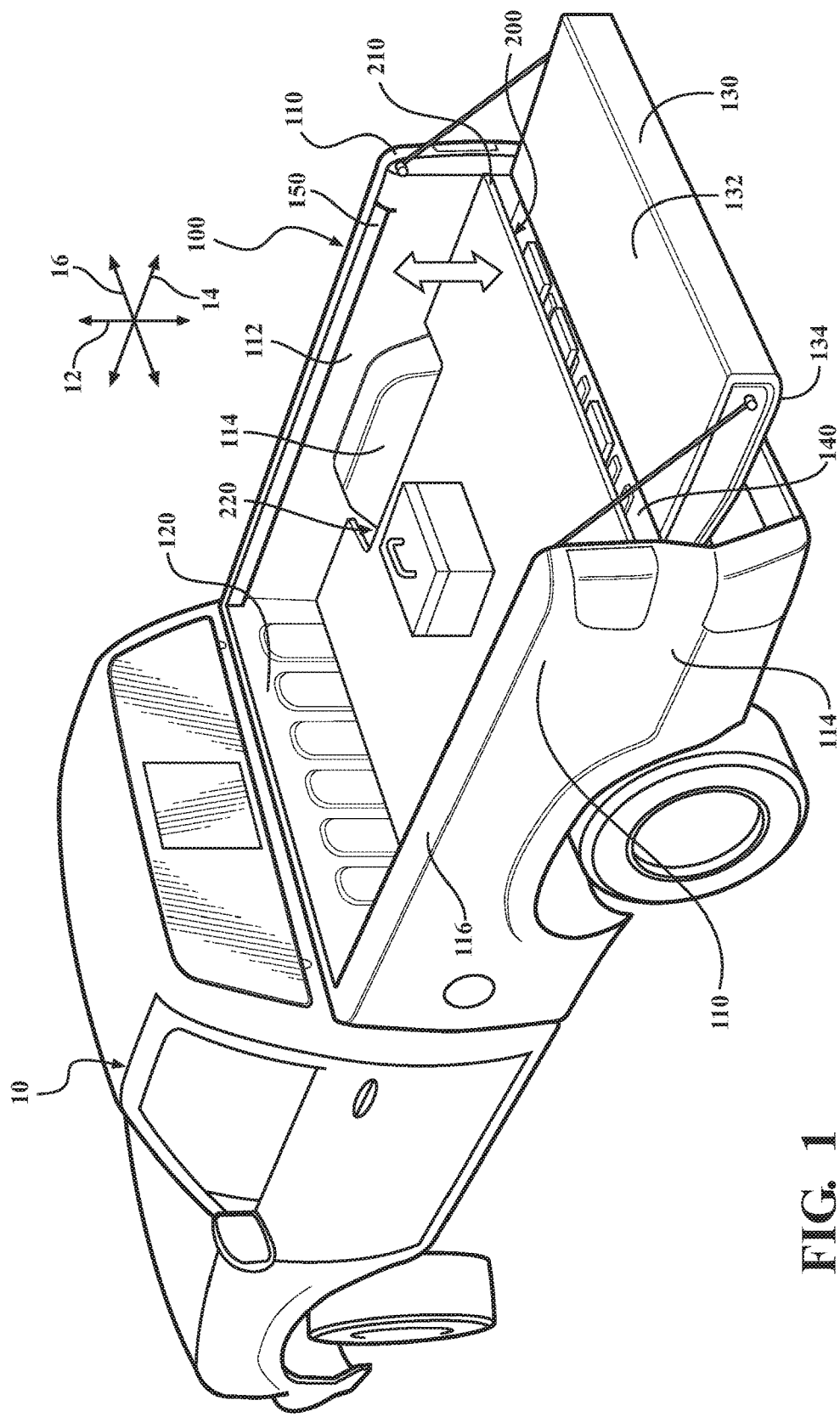
FIG. 1 is an example of a vehicle having an adaptable storage system for a vehicle truck bed.

Arrangements described herein include adaptable storage systems for vehicle truck beds. The system can include a panel having one or more wheel well cutouts. One or more wheel well covers can be operatively connected to the panel. A lift system can be included that can selectively move the panel in an elevational direction between a top position and a bottom position. The wheel well cover(s) can be adaptive relative to the wheel wells to allow substantially unimpeded movement of the panel between the top position and the bottom position. For example, the wheel well cover(s) can include flexible covers and/or sliding covers. Further, the wheel well cover(s) can substantially cover a wheel well cutout when the panel is in the top position. The present detailed description relates to systems and methods that incorporate one or more of such features. In at least some instances, the adaptable storage systems can provide cargo flexibility for a pickup truck bed. For example, the panel can act as a truck bed floor when in a bottom position, and as a tonneau cover in the top position.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example vehicle 10 is shown. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle may be a watercraft, an aircraft or any other form of motorized transport. In one or more arrangements, the vehicle 10 can be a pickup truck vehicle having a truck bed 100. While the vehicle 10 can be a pickup truck as shown in the Figures, it is to be appreciated systems and methods described herein can be utilized in vehicles having other forms of cargo areas. For example, the vehicle 10 can include semi-trucks, vans, minivans, cars, etc.

As shown in FIG. 1, the truck bed 100 can generally include two sides 110, a front panel 120, and a tailgate 130. The truck bed 100 can also include a floor panel 140. Each of the sides 110 can include an inner panel 112, an outer panel 113, and a top cap 116. The tailgate can include an inner panel 132 and an outer panel 134. With the tailgate 130 in a closed position, the truck bed 100 can form a cavity to receive cargo for transport by the vehicle 10. Such a cavity can be defined by the two inner panels 112, the front panel 120, the inner panel 132 of the tailgate 130, and the floor panel 140. In some arrangements, the truck bed 100 can include a truck bed rail 150. The truck bed rail 150 can provide attachment structure for one or more retaining features, such as straps, tie-downs, cables, etc. The truck bed rail 150 can also be configured to allow attachment of truck accessories, such as tonneau covers. The truck bed rail 150 can be located near a top portion of the sides 110, front panel 120, and/or the tailgate 130.

The truck bed 100 can described with reference to an associated elevational direction 12, a longitudinal direction 14, and a lateral direction 16. As used herein, "longitudinal direction" can extend from the front panel 120 to the tailgate 130 of the truck bed 100. "Lateral direction" can extend between two sides 110 of the truck bed 100.

In one or more arrangements, a storage system 200 (also simply "system 200") can be included to provide adaptable storage options for cargo within the truck bed 100. The system 200 can include various elements. Some of the possible elements of the system 200 and the truck bed 100 are shown throughout the Figures and will now be described. It will be understood that it is not necessary for the system 200 to have all of the elements shown in the Figures or described herein. The system 200 can have any combination of the various elements shown and described. Further, the system 200 can have additional elements to those shown and described. In some arrangements, the system 200 may not include one or more of the elements shown in the Figures. Further, while the various elements are shown as being located within the system 200, it will be understood that one or more of these elements can be located external to the system 200. Further, the elements shown may be physically separated by large distances.

In one or more arrangements, the system 200 can include a panel 210 that is moveable in an elevational direction. For instance, the panel 210 can move in the elevational direction 12 within the cavity defined by the truck bed 100. As described in further detail below, the panel 210 can provide storage flexibility both above and below the panel 210. In some arrangements, the panel 210 can be raised near the top of the truck bed 100 to act as a cover for cargo within the truck bed 100. The panel 210 can be lowered to a bottom portion of the truck bed 100, near the floor panel 140, to provide room on top of the panel 210 for large cargo items.

In one or more arrangements, the panel 210 can be substantially rigid. As used herein, "rigid" includes any structure that resists bending or changing shape. For example, the panel 210 can resist bending or changing shape when cargo is placed on top of the panel 210. In some arrangements, the panel 210 can be flexible or include flexible portions. For instance, the panel 210 can bend, deform, and/or otherwise change shape when cargo is placed on top of the panel 210.

Figure 5A:
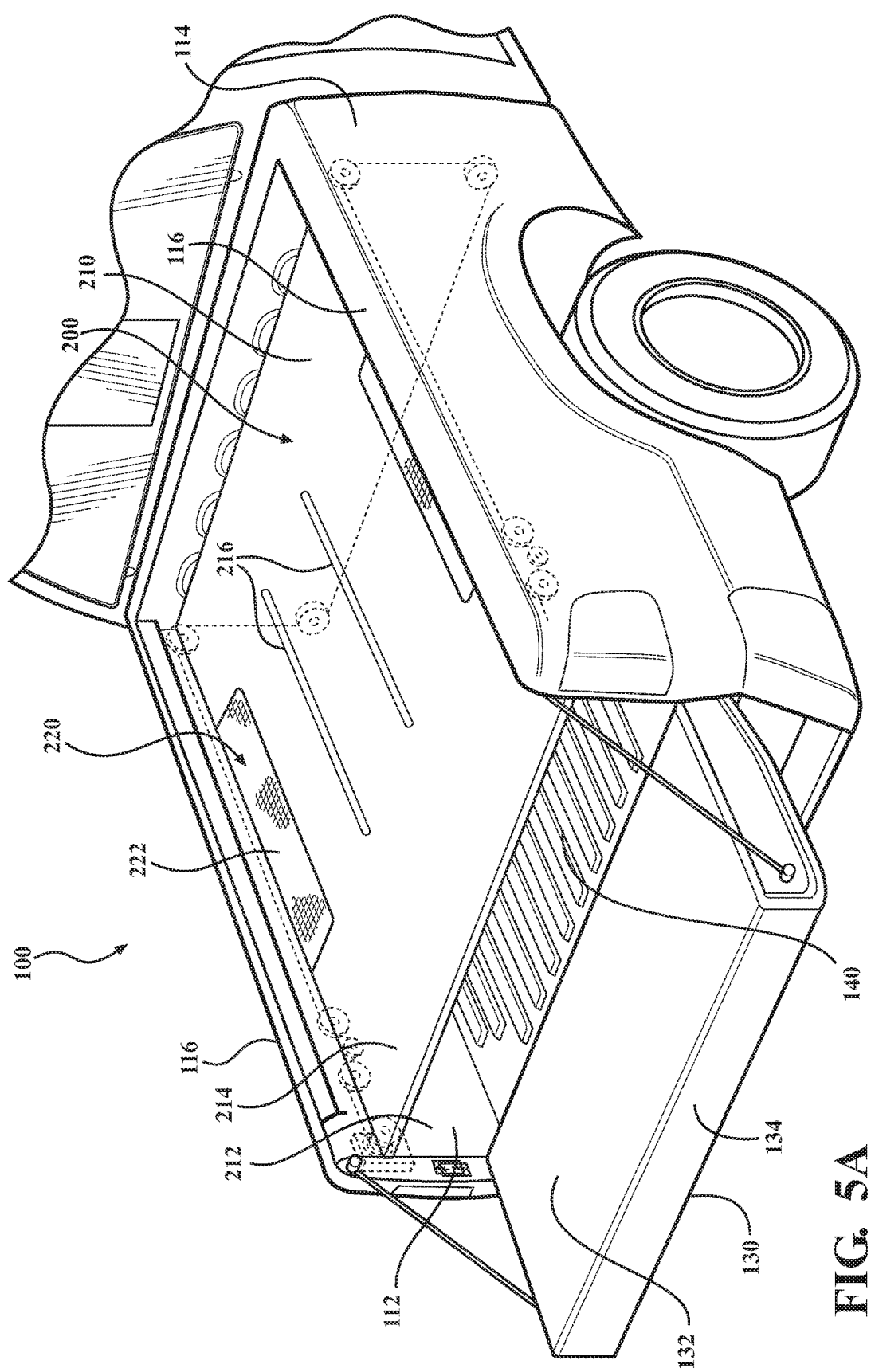
FIGS. 5A and 5B are examples of a vehicle having an adaptable storage system for a vehicle truck bed having flexible wheel well covers.
Figure 5B:
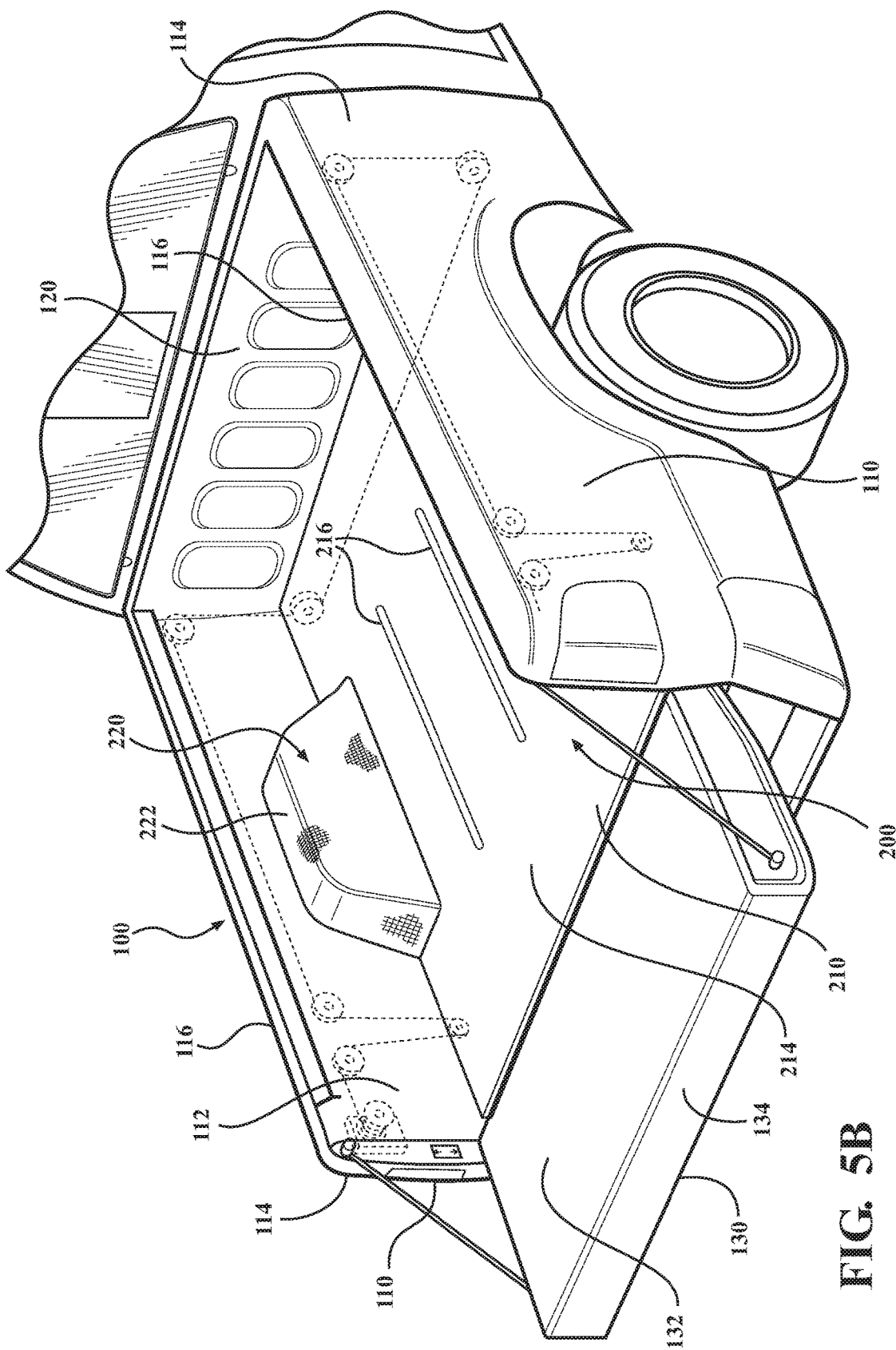

Referring briefly to FIGS. 5A and 5B, the panel 210 can include one or more rails 216. The rails 216 can allow attachment of one or more components to the top of the panel 210. For example, the rails 216 can allow straps, tie-downs, rope, and/or any other fastening component to retain cargo on top of the panel 210. Further, the rails 216 can be configured to receive a vehicle accessory.

The panel 210 can have any suitable size, shape, and/or configuration. The panel 210 can be formed from any suitable material. For instance, the panel 210 can made of one or more metals, polymers, and/or resins. In one non-limiting example, the panel 210 can be made from a fiber-reinforced resin. In one or more arrangements, the panel 210 can have a substantially uniform thickness. Alternatively, the panel 210 can have a non-uniform thickness. For instance, the thickness of the panel 210 can vary in one or more local areas or continuously in one or more directions (e.g., length and/or width). The panel 210 can be substantially solid in construction. Alternatively, as described below, the panel 210 can be hollow or have hollow areas to receive other components of the system 200.

In one or more arrangements, the sides 110 of the truck bed can include one or more wheel wells 114. The wheel well(s) 114 can provide clearance for wheels, suspension, and/or drivetrain components of the vehicle 10. In some arrangements, the wheel well(s) 114 can cause the inner panel(s) 112 to extend inward toward a center portion of the truck bed. As shown in the Figures, the wheel well(s) 114 can have irregular shapes such that a distance between the inner panels 112 can differ depending on a longitudinal and elevational position within the truck bed 100. For example, the wheel well(s) 114 can be sloped such that at a longitudinal position at the wheel well(s) 114, the distance between the inner panels 112 can increase from a lower elevational position towards a higher elevational position. In some instances, the distance between the inner panels 112 at the wheel well(s) 114 can be the least near the floor panel 140.

Figure 2:
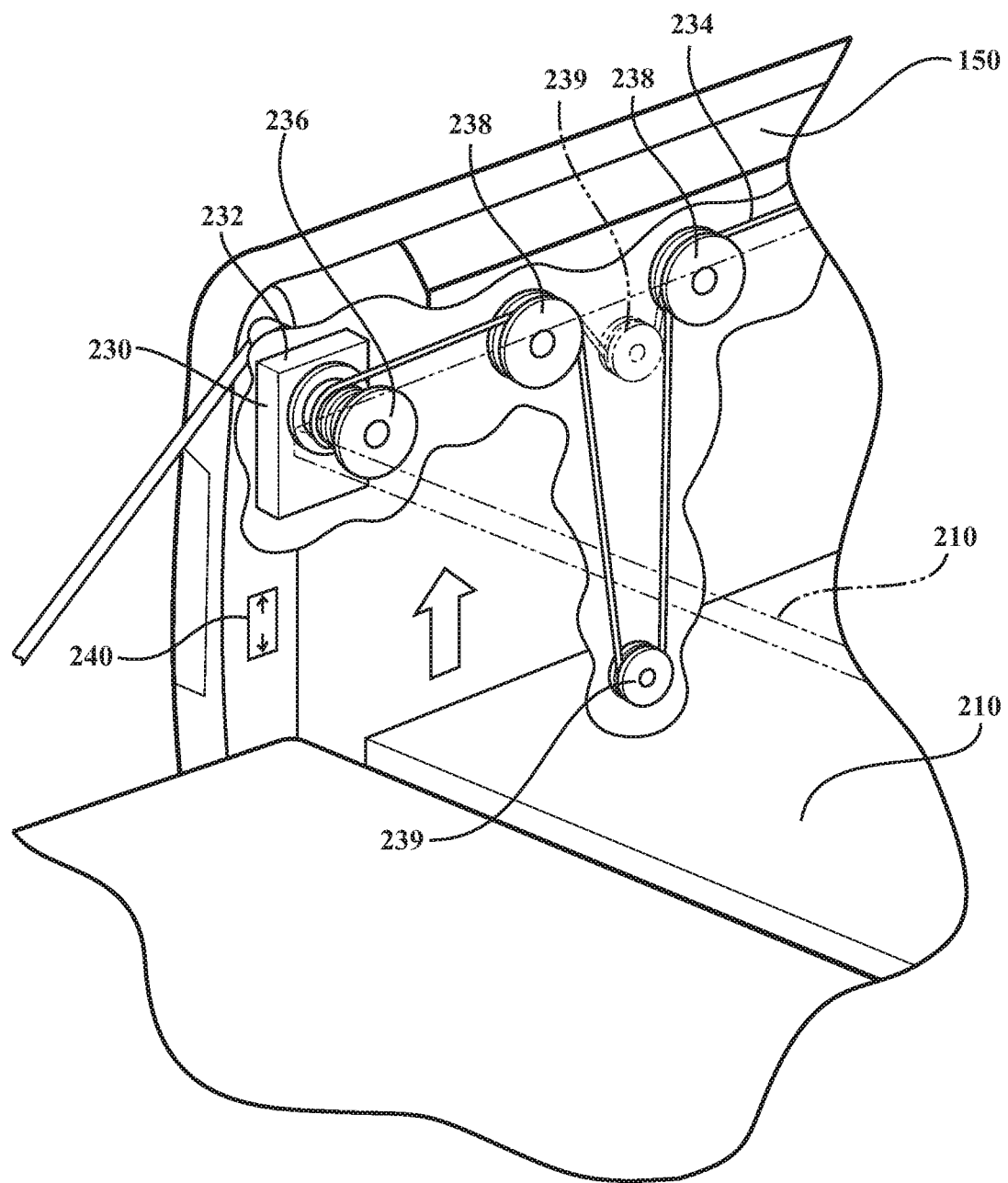
FIG. 2 is partial cutaway view showing a lift system for the adaptable storage system of FIG. 1.

In one or more arrangements, the panel 210 can include one or more wheel well cutouts 220. The wheel well cutout(s) 220 can include any slot, channel, cutaway, and/or aperture, regardless of a method of forming. The wheel well cutouts 220 can provide clearance such that the panel 210 can be lowered near the floor panel 140 without interference with the wheel well(s) 114. In one or more arrangements, the wheel well cutouts 220 can allow a panel 210 that is substantially rigid to be positioned in direct contact with, or in close proximity to, the floor panel 140 (as best shown in FIGS. 2 and 3).

In one or more arrangements, the system 200 can include a lift system 230 that is configured to move the panel 210 within the truck bed 100. Examples of the lift system 230 can be described in reference to FIGS. 2 and 3. It will be understood, however, that it is not necessary for the lift system 230 to have the elements shown in FIGS. 2 and 3, and the lift system 230 can include other suitable elements appreciated by one skilled in the art.

In one or more arrangements, the lift system 230 can include one or more motors 232 and one or more cables 234. As used herein, "motor" includes any device capable of providing motive power to one or more elements of the system 200. For example, the motor(s) 232 can be electric motor(s). The motor(s) 232 can be powered by any suitable power source. For example, the motor(s) 232 can be powered by a battery (not shown) of the vehicle 10. "Cable," as used herein, includes any structure configured to transfer force from input from the motor(s) 232. The cable(s) 234 can include flexible structure, such as ropes wound of wire or nonmetallic fibers.

The motor(s) 232 can be configured to control the movement of the cable(s) 234. For instance, the lift system 230 can include one or more spool(s) 236 to wind and/or unwind the cable(s) 234. The spool(s) 236 can include any structure configured to transfer rotational input from the motor(s) 232 to movement of the cable(s) 234. For example, the spool(s) 236 can wind the cable(s) 234 around itself as it is turned by the motor(s) 232.

The lift system 230 can further include one or more pulleys. As used herein, "pulley" includes any structure capable of changing the direction of movement or force of the cable(s) 234. In one or more arrangements, the drive system 230 can include one or more fixed pulleys 238. The fixed pulley(s) 238 can be substantially fixed in their axial position relative to elements of the truck bed 100. The fixed pulley(s) 238, while remaining fixed in an axial position, can be configured to rotate. In one or more arrangements, the fixed pulley(s) 238 can be positioned within a side 110 near a top portion of the truck bed 100.

The lift system 230 can also include one or more panel pulleys 239. In some arrangements, the panel pulley(s) 239 can be configured to move relative to the truck bed 100. For example, the panel pulley(s) 239 can move substantially in the elevational direction 12 based on forces and/or movement of the cable(s) 234. In one or more arrangements, the panel pulley(s) 239 can be operatively connected to the panel 210. The term "operatively connected," as used throughout this description, can include direct or indirect connections, including connections without direct physical contact. The panel 210 can move as the panel pulley(s) 239 are moved.

There can be any suitable number of fixed pulleys 238 and/or panel pulleys 239. For example, as shown in FIGS. 5A and 5B, there can be multiple panel pulleys 239. In one non-limiting example, there can be four panel pulleys 239, with each located near a corner of the panel 210.

In one or more arrangements, the movement of the cable(s) 234 via the motor(s) 232 can cause the panel 210 to move. For instance, examples of the operation of the lift system 230 can be described with reference to FIGS. 2-5B. In some arrangements, the panel 210 can be operatively connected to the panel pulley(s) 239 in fixed relation thereto. Thus, the panel 210 can move as the panel pulley(s) 239 are moved. In one or more arrangements, the motor(s) 232 can be activated to rotate the spool(s) 236. This rotation can pull the cable(s) 234 toward and around the spool(s) 236. The cable(s) 234 can, in turn, raise the panel pulley(s) 239 and the panel 210.

While it is appreciated that the above-description of the use of motors, cables, and pulleys are one way of accomplishing movement of the panel 210, other methods and elements may be used. For example, other configurations of motors, pulleys, and/or cables can be used. Further, other powered elements can be used. For example, linear actuators, such as mechanical, pneumatic, hydraulic, piezoelectric, and/or mechanical and electrical hybrid actuators could be used. Alternatively or in addition, non-powered lift systems can be used. For example, a user could manually lift the panel 210. Further, the motor(s) 232 can be replaced with non-powered mechanical elements such as ratchet and/or crank mechanisms.

In one or more arrangements, the drive system 230 can include one or more user inputs 240. A "user input" can include any device, component, system, element, or arrangement or groups thereof that enable a user to control one or more aspects of the system 200. Any suitable user input can be used, including, for example, a keypad, touchscreen, button, joystick, and/or switch. The user input 240 can also include structure that allows for inputs in the form of voice commands and/or gestures. The user input 240 can be configured to receive an input from a user. In some arrangements, the input can be to raise or lower the panel 210. Further, the input can include specific positions for the panel 210.

As shown in FIG. 2, the user input 240 can be located within the truck bed 100. For example, it can be located at one or both of the sides 110 near the tailgate 130. Alternatively or in addition, the input 240 can be located elsewhere, including inside a passenger compartment of the vehicle 10 and/or on external devices (e.g., smartphone application). In one or more arrangements, the user input 240 can cause one or more elements of the system 200 to activate. For example, the motor(s) 232 can be activated upon an input received from a user.

As mentioned previously, the panel 210 can be moveable to different positions within the truck bed 100. As shown in FIG. 3, these positions can include a bottom position, a top position, and one or more intermediate positions. For instance, the panel 210a is shown in a bottom position in FIG. 3. The bottom position can include positions of the panel 210 in which the panel 210 contacts, or is in close proximity to, the floor panel 140. In the bottom position, a substantial majority of the cargo area within the truck bed 100 is available for storing cargo items on top of the panel 210. As used herein, substantial majority can include greater than or equal to about 80%, greater than or equal to about 90%, greater than or equal to about 95%, and/or greater than or equal to about 99%.

The panel 210b is shown in a top position in FIG. 3. In one or more arrangements, the top position can include positions of the panel 210 in which the panel 210 extends near the top of the truck bed 100. For example, the panel 210 can directly contact, or be in close proximity to, the truck bed rail(s) 150. Alternatively, the panel 210 can extend such that a top surface of the panel 210 is substantially aligned with a top surface of the top cap 116. In such an arrangement, there is minimal, if any, elevational offset between the panel 210 and the sides 110. In one or more arrangements, the panel 210 can act as a truck bed cover, or tonneau cover, in the top position, allowing cargo items to be stored below the panel 210 or on top of the panel 210.

The panel 210c is shown in an intermediate position. The intermediate position can be any position of the panel 210 between the top position and the bottom position in the elevational direction 12. In one or more arrangements, the panel 210 can be positioned at any desirable intermediate position within the truck bed 100. Alternatively, the panel 210 can be positioned at a predetermined number of distinct intermediate positions.

In one or more arrangements, the system 200 can include one or more seals. The seals can be any suitable structure intended to resist the movement of fluid between the panel 210 and elements of the truck bed 100. As shown in FIG. 4, the system 200 can include one or more seals 218a and/or 218b. The seal 218a can be a bulb seal configured to seal between a top surface of the panel 210 and a bottom surface of the bed rail 150. For instance, the seal 218a can be configured to compress as the panel 210 moves toward the bed rail 150. The seal 218b can be a lip seal designed to seal between an inner panel 112 of the side 110 and the panel 210. For instance, the seal 218b can be configured to bend and/or compress between the inner panel 112 and a side of the panel 210. In some arrangements, the seals can resist fluid, such as water, from entering a storage cavity underneath the panel 210.

In one or more arrangements, the system 200 can include one or more wheel well covers that are operatively connected to the panel 210. The wheel well cover(s) can be adaptable to substantially cover the wheel well cutouts 220 of the panel 210. As used herein, "substantially cover" as used with the wheel well covers includes any arrangement in which the wheel well covers extend about, or fill-in, a majority of the area of the wheel well cutout 220. The wheel well covers can provide substantial coverage of the truck bed 100 by the system 200 at different elevational positions of the panel 210. In one or more arrangements, the wheel well cover(s) can substantially cover the wheel well cutouts 220 when the panel 210 is in the top position. Further, in some arrangements, the wheel well cover(s) can adapt relative to the wheel wells 114 to allow substantially unimpeded movement of the panel 210 between the top position and the bottom position. As used herein, "substantially unimpeded movement" means that the panel 210 is allowed to move from the top position to the bottom position without damage or deformation of the panel 210. In some arrangements, the panel 210 can move between the top and bottom positions substantially unimpeded if the panel 210 does not make contact with the wheel wells 114. This can be achieved by allowing the wheel wells 114 to extend through the wheel well cutouts 220 in one or more positions of the panel 210.

In one or more arrangements, the wheel well cover(s) can include one or more flexible covers 222 as shown in FIGS. 5A and 5B. FIG. 5A shows the panel 210 in a top position. In some arrangements, the flexible cover(s) 222 can extend substantially flat while filling in, and substantially covering, the wheel well cutout(s) 220 of the panel 210 in the top position.

FIG. 5B shows the panel 210 in a bottom position. In some arrangements, the flexible cover(s) 222 can remain operatively connected to the panel 210 while changing shape as contact is made with the wheel wells 114. For example, the flexible cover(s) 222 can be stretched over a portion of the wheel well 114 as the panel 210 lowers. The flexible covers 222 are shown stretching over substantially the entire wheel well 114 in FIG. 5B. It is to be appreciated that the flexible cover(s) 22 can stretch in other ways, such as stretching inward and exposing the wheel well 114 when the panel 210 is in the bottom position.

The flexible cover(s) 222 can be formed from any suitable material that allows the flexible cover 222 to change shapes. For instance, the flexible cover(s) 222 can be formed from a material that can be flexible, stretchable, and/or elastic. In one non-limiting example, the flexible cover(s) 222 can be formed from a neoprene material. In some arrangements, the flexible cover(s) 222 can be formed from a waterproof or water-resistant material. In one or more arrangements, the flexible cover(s) 222 can have a substantially uniform thickness. Alternatively, the flexible cover(s) 222 can have a non-uniform thickness. For instance, the thickness of the flexible cover(s) 222 can vary in one or more local areas or continuously in one or more directions (e.g., length and/or width). In one example, the flexible cover(s) 222 can be thicker or thinner in areas that need to stretch more than other areas of the flexible cover(s) 222.

Figure 6A:
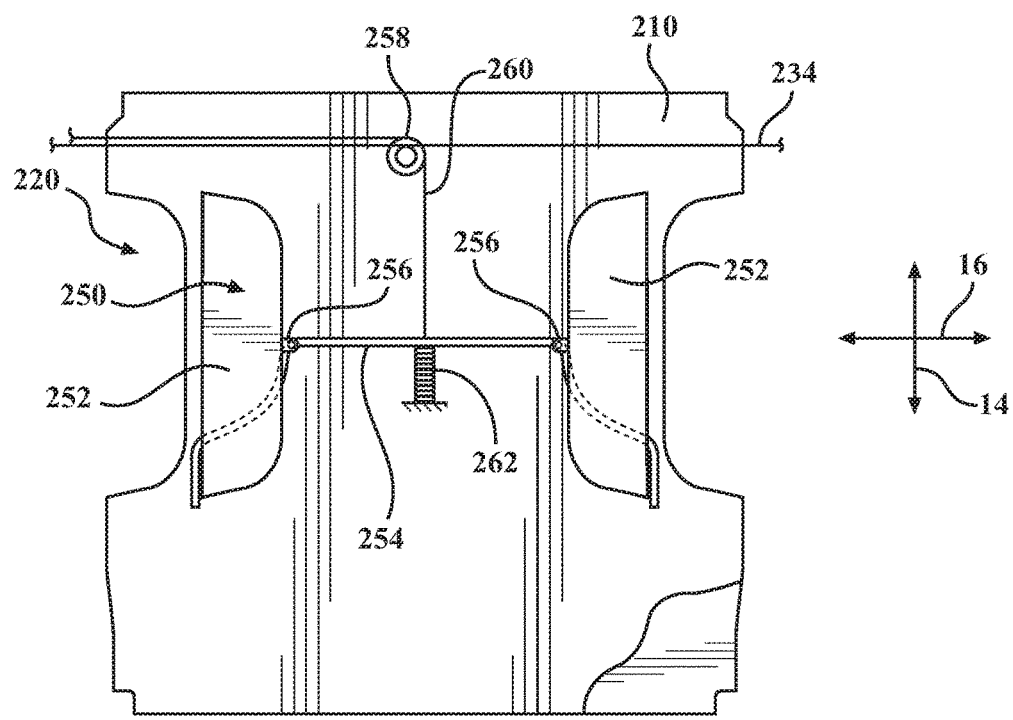
FIGS. 6A and 6B are examples of an adaptable storage system for a vehicle truck bed having sliding wheel well covers.
Figure 6B:
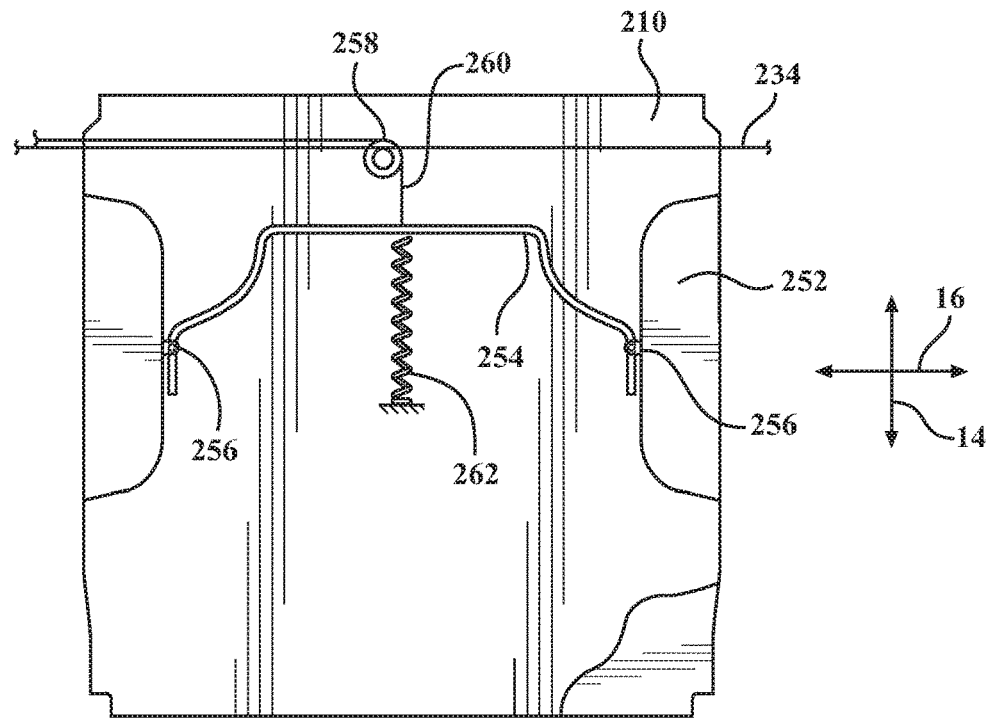
Figure 7:
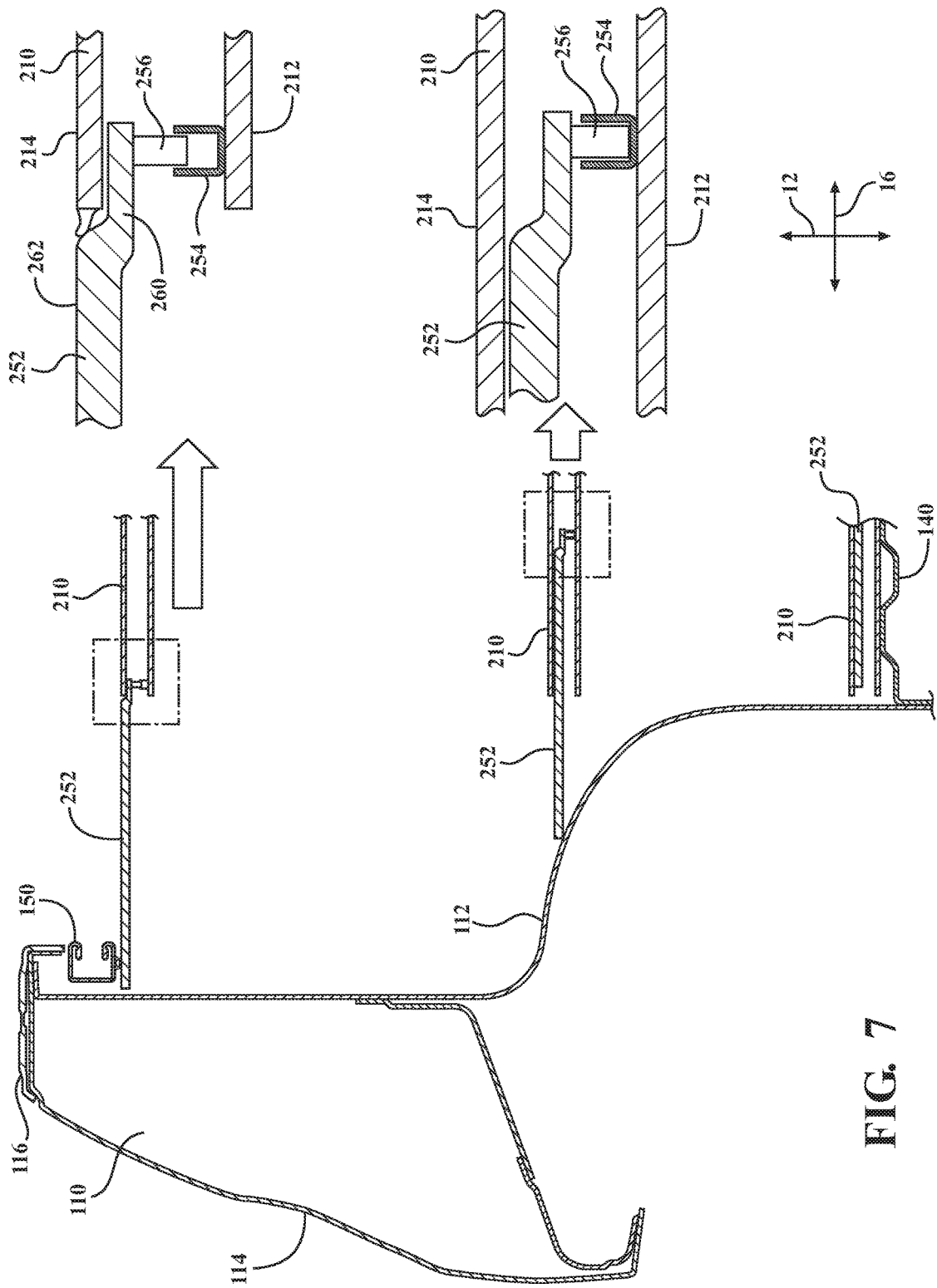
FIG. 7 is a partial cross-sectional view showing different positions of the adaptable storage system of FIGS. 6A and 6B.

Referring now to FIGS. 6A-7, the wheel well covers 250 can include one or more sliding covers 252. In these arrangements, the sliding covers 252 can be configured to slide relative to the panel 210 to cover/uncover the wheel well cutouts 220. The sliding cover(s) 252 can move translationally relative to the panel 210, rotate relative to the panel 210, and/or move with a combination of translational and rotational elements. In the examples shown in the Figures, the sliding covers 252 can move substantially in the lateral direction 16.

FIG. 6A shows an arrangement in which the sliding covers 252 are in a retracted position. In the retracted position, the wheel well cutouts 220 can remain substantially uncovered by the sliding covers 252. In some instances, the example shown in FIG. 6A can correspond to a bottom position of the panel 210 (as shown in FIG. 7 and described in further detail below). In the retracted position, the sliding covers 252 are slid and/or rotated away from the wheel well cutouts 220.

FIG. 6B shows an arrangement in which the sliding covers 252 are in an extended position. In the extended position, the wheel well cutouts 220 can be substantially covered, or filled-in, by the sliding covers 252. In some instances, the example shown in FIG. 6B can correspond to any position of the panel 210 in which it is completely above the wheel wells 114 in the elevational direction 12, such as in the top position.

In one or more arrangements, the sliding covers 252 can also be positioned in partially extended positions. In the partially extended positions, the wheel well cutouts 220 can be partially covered by the sliding covers 252. These partially extended positions can allow the sliding covers 252 to extend close to non-uniform wheel wells 114.

As shown in FIGS. 6A and 6B, the system 200 can include a guide rail 254 that can direct movement of the sliding covers 252. In some arrangements, the sliding covers 252 can be operatively connected to the guide rail 254 via a pin 256. The pin 256 can be configured to move along the guide rail 254. In one or more arrangements, the guide rail 254 can be configured to move relative to the panel 210 in order to move the sliding covers 252. For instance, the guide rail 254 can move substantially along the longitudinal direction 14.

In one or more arrangements, the system 200 can include a guide rail pulley 258 and a guide rail cable 260. The guide rail cable 260 can be operatively connected to the guide rail 254 and cause movement of the guide rail 254. For instance, a motor and/or spool can pull the guide rail cable 260 to move the guide rail 254 in substantially the longitudinal direction 14. In some arrangements, the motor and/or spool can be the motor 232 and/or spool 236 of the lift system 230. Alternatively, a separate motor and/or spool can be used to move the guide rail cable. In arrangements in which there is a separate motor and/or spool for the guide rail, the above descriptions of the motor 232 and/or spool 236 can apply equally to these elements.

In some arrangements, the system 200 can include a biasing element, such as a spring 262. The spring 262 can be a tension spring operable under a tensile load. In one or more arrangements, the spring 262 can bias the guide rail towards a rearward position (shown in FIG. 6A).

In one or more arrangements, the sliding covers 252 can be constrained from moving along the longitudinal direction 14. For example, the sliding covers 252 can be configured to fit within predefined grooves or hollow areas within the panel 210. As the guide rail 254 moves in the longitudinal direction 14, the pins 256 can follow the guide rail 254. This can cause the sliding covers 252 to move outward in substantially the lateral direction 16. In one or more arrangements, the system 200 moves the guide rail 254 as the panel 210 moves. For instance, as the panel 210 moves up toward the top position, the guide rail 254 can be moved forward, which can extend the sliding covers 252. Further, when the panel moves toward the bottom position, the guide rail 254 can be moved rearward, which can retract the sliding covers 252.

It is to be appreciated that the movement of the sliding covers 252 can be based on several factors, including but not limited to, the shape of the guide rail, the distance the guide rail 254 is moved, the speed in which the guide rail 254 is moved, and the speed at which the panel 210 is raised or lowered. For example, the shape of the guide rail 254 can be chosen to cause the sliding covers 252 to be close to the inner panel 112 at a variety of elevational positions of the panel 210, including in those positions near the wheel wells 114.

The sliding cover(s) 252 can be operatively connected to the guide rail 254 and/or the panel 210 in any suitable way. In some arrangements, the guide rail 254 can be positioned within a hollow area of the panel 210. For instance, as shown in FIG. 7, the guide rail 254 can be positioned between a lower portion 212 and an upper portion 214 of the panel 210. Further, the sliding cover 252 can be positioned between the lower portion 212 and the upper portion 214 when in the retracted position (shown at the bottom of FIG. 7). Portions of the sliding cover 215 can be positioned between the lower portion 212 and the upper portion 214 in the partially extended and extended positions (shown in the middle and at the top of FIG. 7).

In one or more arrangements, the sliding cover(s) 252 can have a tapered end 264 that is operatively connected to the pin 256. The tapered end 264 can be shaped to allow an outer surface 266 of the sliding cover(s) 252 to be substantially flush with an outer surface of the panel 210. As shown in FIG. 7, the sliding cover(s) 252 can move slightly upward in the elevational direction 12 when in the extended position. This allows the outer surface 266 to raise to the level of an outer surface of the panel 210. In some arrangements, a seal can be positioned between the panel 210 and the sliding cover(s) 252 as shown in FIG. 7. For example, the seal can be a lip seal, and can prevent and/or reduce water from passing between the panel 210 and the sliding cover(s) 252.

The sliding cover(s) 252 can have any suitable configuration. In one or more arrangements, the sliding cover(s) 252 are sized to correspond to the size of the wheel well cutouts 220. The sliding cover(s) 252 can be formed from any suitable material. For instance, the sliding cover(s) 252 can made of one or more metals, polymers, and/or resins. In one non-limiting example, the sliding cover(s) 252 can be made from a fiber-reinforced resin. In one or more arrangements, the sliding cover(s) 252 can have a substantially uniform thickness. Alternatively, the sliding cover(s) 252 can have a non-uniform thickness. For instance, the thickness of the sliding cover(s) 252 can vary in one or more local areas or continuously in one or more directions (e.g., length and/or width). The sliding cover(s) 252 can be substantially solid in construction. Alternatively, the sliding cover(s) 252 can be hollow or have hollow areas.

In one or more arrangements, the sliding cover(s) 252 can comprise a plurality of panels. For instance, as the sliding cover 252 can retract within the panel 210 as shown in FIG. 7, the sliding cover(s) 252 themselves can include retractable portions. For instance, the sliding cover(s) 252 can include one or more panels configured to "nest" within themselves in a retracted position.

Figure 8:
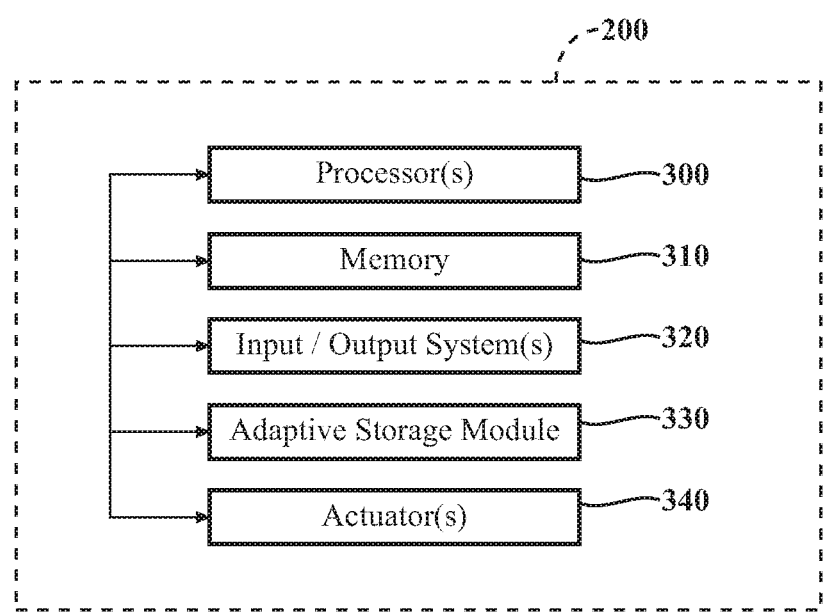
FIG. 8 is a block diagram of computing elements in an adaptable storage system for a vehicle truck bed.

Referring to FIG. 8, another arrangement of system 200 can be shown and described. In one or more arrangements, the system 200 can include one or more computing elements to control elements within the system 200. The system 200 can include one or more processors 300. As used herein, "processor" means any component or group of components that are configured to execute any of the processes described herein or any form of instructions to carry out such processes or cause such processes to be performed. In some arrangements, the processor(s) 300 can include a vehicle electronic control unit (ECU).

The system 200 can include memory 310 and/or one or more other data stores for storing one or more types of data. The memory 310 can include volatile and/or non-volatile memory. The memory 310 can be a component of the processor(s) 300, or the memory 310 can be operatively connected to the processor(s) 300 for use thereby. In one or more arrangements, the memory 310 can include instructions to allow the processor(s) 300 to control one or more elements of the system 200.

The system 200 can include one or more input/output systems 320. An "input system" includes any device, component, system, element or arrangement or groups thereof that enable information/data to be entered into a machine. The input system can receive an input from a user. Any suitable input system can be used, including, for example, a keypad, display, touch screen, multi-touch screen, button, joystick, mouse, trackball, microphone and/or combinations thereof. In some examples, the input/output system 320 can include the user input 240. An "output system" includes any device, component, system, element or arrangement or groups thereof that enable information/data to be presented to a vehicle occupant (e.g. a person, a vehicle occupant, etc.). The output system can present information/data to a vehicle occupant. The output system can include a display. Alternatively or in addition, the output system may include a microphone, earphone and/or speaker. Some components of the system 200 may serve as both a component of the input system and a component of the output system.

The system 200 can include one or more adaptive storage modules 330. The adaptive storage module(s) 330 can be implemented as computer readable program code that, when executed by a processor, implement various processes, some of which are described herein. The adaptive storage module(s) 330 can be configured to perform various functions, including, for example, moving elements of the system 200, such as the panel 210. The adaptive storage module(s) 330 can be a component of the processor(s) 300. The adaptive storage module(s) 330 can include instructions (e.g., program logic) executable by the processor(s) 300. Alternatively or in addition, the memory 310 may contain such instructions.

The system 200 can include one or more actuators 340. The actuators 340 can be any element or combination of elements operable to modify, adjust and/or alter one or more components of the system 200 responsive to receiving signals or other inputs from the processor(s) 300. Any suitable actuator can be used. For instance, the one or more actuators 340 can include motors, pneumatic actuators, hydraulic pistons, relays, solenoids, and/or piezoelectric actuators, just to name a few possibilities. In one or more arrangements, the actuator(s) 340 can include, or be operative connected to, the motor(s) 232.

In one or more arrangements, the input/output system 320 can include a sensor system (not shown). The sensor system can determine, assess, monitor, measure, quantify, and/or sense one or more aspects of the vehicle 10, the truck bed 100, and/or the system 200. In some arrangements, the sensor system can determine when to move the panel 210 or other components of the system 200. For example, the sensor system can determine whether an input has been received to move the panel 210 to a desired position. The sensor system can also determine different aspects of cargo loading in the vehicle. For example, the sensor system can determine if, and how much, cargo is being stored on and/or under the panel 210. This can allow the system 200 to prevent any movement of the panel 210 that could result in damage to cargo and/or danger to users. In yet another example, the sensor system can determine how the system 200 affects the vehicle 10. For example, the sensor system can determine if the position of elements of the system 200 or cargo is affecting driving dynamics, such as fuel economy and/or aerodynamics of the vehicle 10. In some instances, the panel 210 can be moved to optimize driving dynamics, such as the fuel economy and/or aerodynamics of the vehicle 10.

Now that the various potential systems, devices, elements and/or components of the system 200 have been described, various methods of using such a system will now be described. Various possible steps of methods will now be described and such methods may be applicable to the embodiments described above in relation to FIGS. 1-8, but it is understood that the methods can be carried out with other suitable systems and arrangements.

In one or more arrangements, methods can include receiving an intended elevational position input for the panel. The input can be received from an input system, such as the user input 240 and/or the input/output system 320. For example, the intended elevational position of the panel 210 can be based on a raise or lower input, or an input specifying a predetermined position (e.g., top position, bottom position).

Alternatively or in addition, the input can be received from the sensor system and/or the processor(s) 300. For instance, the processor(s) 300 can determine an intended elevational position of the panel 210 based on information received from the sensor system. The intended elevational position of the panel 210 can be based on, for example, a sensed cargo below or on top of the panel 210, weight distribution within the truck bed 100, aerodynamic characteristics of the vehicle 10, and/or physical characteristics of one or more users.

In some arrangements, methods can include determining whether the intended elevational position is different from a current position. If the intended elevational position is the same as the current position, no further action may be needed.

Responsive to receiving the input, methods can include causing the panel to move from the current position to the intended elevational position. In one or more arrangements, the processor(s) 300 can cause the lift system 230 to move the panel 210. For example, a signal from the processor(s) 300 can activate the motor(s) 232 to move the cable(s) 243 to move the panel 210.

In one or more arrangements, the two wheel well covers can be adaptive relative to the wheel wells to allow substantially unimpeded movement of the panel. For instance, the wheel well covers can include the flexible cover(s) 222 and/or the sliding cover(s) 252 which may adapt as described above.

It will be appreciated that arrangements described herein can provide numerous benefits, including one or more of the benefits mentioned herein. For example, arrangements described herein can provide flexibility in storing cargo items in a vehicle pickup truck bed. Arrangements described herein can provide an adjustable panel that can serve as both a truck bed floor when in a bottom position, a truck bed tonneau cover when in a top position, and a truck bed divider when in intermediate positions. Raising the panel with cargo items stored on top of the panel can allow users to access the cargo easier. Raising the panel and storing cargo underneath can protect the cargo from theft, the elements, and from accidentally exiting the truck bed. Further, the panel can provide aerodynamic benefits when in a top position. Arrangements described herein provide wheel well covers that adapt to allow the panel to be raised and lowered between the top and bottom positions. In some examples, the wheel well covers can be flexible covers designed to change shape upon contacting the wheel wells. In other examples, the wheel well covers can including sliding covers that are configured to move laterally as the panel is raised/lowered.

The block diagram in the Figures illustrate the architecture, functionality, and operation of possible implementations of systems, methods and computer program products according to various embodiments. In this regard, each block in the block diagram may represent a module, segment, or portion of code, which comprises one or more executable instructions for implementing the specified logical function(s).

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An adaptable storage system for a vehicle truck bed, the vehicle truck bed having two wheel wells, the system comprising:
   a panel having a wheel well cutout; and
   a wheel well cover operatively connected to the panel,
   the panel being configured for selective movement in an elevational direction between a top position and a bottom position,
   the wheel well cover being adaptive relative to the wheel wells to allow substantially unimpeded movement of the panel between the top position and the bottom position,
   the wheel well cover configured to substantially cover the wheel well cutout when the panel is in the top position, wherein the wheel well cover is a sliding cover, the sliding cover configured to laterally slide as the panel moves in the elevational direction.

2. An adaptable storage system for a vehicle truck bed, the vehicle truck bed having two wheel wells, the system comprising:
   a panel having a wheel well cutout; and
   a wheel well cover operatively connected to the panel,
   the panel being configured for selective movement in an elevational direction between a top position and a bottom position,
   the wheel well cover being adaptive relative to the wheel wells to allow substantially unimpeded movement of the panel between the top position and the bottom position,
   the wheel well cover configured to substantially cover the wheel well cutout when the panel is in the top position; and
   a lift, the lift comprising:
      a motor;
      a spool rotatable by the motor; and
      a cable operatively connected to the spool and the panel.

3. The system of claim 2, wherein the lift further comprises:
   one or more fixed pulleys operatively connected to the vehicle truck bed; and
   one or more panel pulleys operatively connected to the panel.

4. The system of claim 2, wherein the lift is further configured to retain the panel in one or more intermediate positions between the top position and the bottom position.

5. The system of claim 1, wherein the panel is in direct contact with a vehicle truck bed floor panel in the bottom position.

6. The system of claim 1, wherein the panel is proximate to a vehicle truck bed rail in the top position.

7. An adaptable storage system for a vehicle truck bed, the vehicle truck bed having two wheel wells, the system comprising:
   a panel having a wheel well cutout; and
   a wheel well cover operatively connected to the panel, the panel being configured for selective movement in an elevational direction between a top position and a bottom position, the wheel well cover being adaptive relative to the wheel wells to allow substantially unimpeded movement of the panel between the top position and the bottom position, the wheel well cover configured to substantially cover the wheel well cutout when the panel is in the top position, wherein the wheel well cover is a flexible cover, the flexible cover configured to change shape during contact with at least a portion of the wheel wells.

8. The system of claim 7, wherein the flexible cover is elastic and stretches over one of the wheel wells when the panel is in the bottom position.

9. The system of claim 7, wherein the flexible cover is substantially flat in the top position.

10. The system of claim 1, wherein the sliding cover is configured to move laterally inward as the panel moves toward the bottom position.

11. A vehicle having an adaptable storage system, the vehicle comprising:
    a bed defined at least in part by a front panel, two sides, a tailgate, and a floor panel, the two sides each having an inner panel defining a wheel well; and
    an adaptable storage system, the system comprising:
       a panel having two wheel well cutouts;
       two wheel well covers operatively connected to the panel; and
       a lift operatively connected to at least one of the two sides, the lift configured to selectively move the panel in an elevational direction between a top position and a bottom position,
    the two wheel well covers being adaptive relative to the wheel wells to allow substantially unimpeded movement of the panel between the top position and the bottom position,
    the two wheel well covers configured to substantially cover the two wheel well cutouts when the panel is in the top position, wherein each of the two wheel well covers is a sliding cover, the sliding cover configured to laterally slide as the panel moves in the elevational direction.

12. The vehicle of claim 11, wherein the lift comprises:
    a motor;
    a spool rotatable by the motor;
    a cable operatively connected to the spool and the panel;
    one or more fixed pulleys operatively connected to the bed; and
    one or more panel pulleys operatively connected to the panel.

13. The vehicle of claim 12, wherein the panel is in direct contact with the floor panel in the bottom position and the panel is proximate to a vehicle truck bed rail in the top position.

14. The vehicle of claim 12, wherein the lift is further configured to retain the panel in one or more intermediate positions between the top position and the bottom position.

15. A vehicle having an adaptable storage system, the vehicle comprising:
    a bed defined at least in part by a front panel, two sides, a tailgate, and a floor panel, the two sides each having an inner panel defining a wheel well; and
    an adaptable storage system, the system comprising:
       a panel having two wheel well cutouts;
       two wheel well covers operatively connected to the panel; and
       a lift operatively connected to at least one of the two sides, the lift configured to selectively move the panel in an elevational direction between a top position and a bottom position, the two wheel well covers being adaptive relative to the wheel wells to allow substantially unimpeded movement of the panel between the top position and the bottom position, the two wheel well covers configured to substantially cover the two wheel well cutouts when the panel is in the top position, wherein the wheel well cover is a flexible cover, the flexible cover configured to change shape during contact with at least a portion of the wheel wells.

16. The vehicle of claim 15, wherein the flexible cover is elastic and stretches over one of the wheel wells when the panel is in the bottom position.

17. The vehicle of claim 11, wherein the sliding cover is operatively connected to the panel via a pin and guide rail, the sliding cover being configured to move in the lateral direction as the guide rail moves in a longitudinal direction.

18. The system of claim 1, wherein the sliding cover is operatively connected to the panel via a pin and guide rail, the sliding cover being configured to move in the lateral direction as the guide rail moves in a longitudinal direction.

* * * * *